US006981562B2

(12) United States Patent
Takahashi

(10) Patent No.: US 6,981,562 B2
(45) Date of Patent: Jan. 3, 2006

(54) BIPED LOCOMOTION ROBOT

(75) Inventor: Hideaki Takahashi, Saitama-ken (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/416,850

(22) PCT Filed: Nov. 14, 2001

(86) PCT No.: PCT/JP01/09953

§ 371 (c)(1),
(2), (4) Date: May 16, 2003

(87) PCT Pub. No.: WO02/40229

PCT Pub. Date: May 23, 2002

(65) Prior Publication Data

US 2004/0030447 A1      Feb. 12, 2004

(30) Foreign Application Priority Data

Nov. 17, 2000  (JP) .............................. 2000-351870

(51) Int. Cl.
*B25J 5/00* (2006.01)
(52) U.S. Cl. .......................................... 180/8.6; 901/1
(58) Field of Classification Search ................. 180/8.5, 180/8.6; 901/1, 48; 700/900
See application file for complete search history.

(56) References Cited

U.S. PATENT DOCUMENTS 4,834,200 A * 5/1989 Kajita ......................... 180/8.1
5,151,859 A * 9/1992 Yoshino et al. ............... 701/23
5,159,988 A * 11/1992 Gomi et al. .................. 180/8.6
5,337,235 A * 8/1994 Takahashi et al. ............ 701/23
5,357,433 A * 10/1994 Takenaka et al. ............. 701/23
5,426,586 A * 6/1995 Ozawa ......................... 701/23

(Continued)

FOREIGN PATENT DOCUMENTS

JP        5-93778        12/1993

(Continued)

*Primary Examiner*—Kevin Hurley
(74) *Attorney, Agent, or Firm*—Squire, Sanders & Dempsey L.L.P.

(57) ABSTRACT

The movement analysis becomes easy and the control of all the movement systems is realized better through the initialization of the multiple coordinate systems. The fundamental body portion 6 is coupled to a foot portion 5 through a first joint portion 7, a first link 3, a second joint portion 8, a second link 4, and a third joint portion 9. The rigidity of the first link 3 is lower than that of the fundamental body portion 6, and the rigidity of the second link 4 is lower than that of the second link 4. It is possible to position the second link 4 and the foot portion 5 in a high precision to a mechanical origin which is predetermined to the fundamental body portion, for the reason of the rigidity relation. Handle portions 13 are coupled in two positions to the fundamental body portion 6. When the whole posture is initialized based on the mechanical origin, the center of gravity G of the whole robot is located between two vertical planes containing the two positions. In the initialization, a first joint portion 7, a second joint portion 8, and a third joint portion 9 are located between the two vertical planes. Thus, because the whole balance is taken, the origin adjustment is easy.

4 Claims, 15 Drawing Sheets

U.S. PATENT DOCUMENTS 5,455,497 A * 10/1995 Hirose et al. .......... 318/568.12
5,807,011 A * 9/1998 Hong et al. .................... 403/62
6,064,167 A * 5/2000 Takenaka et al. ...... 318/568.12
6,564,888 B1 * 5/2003 Gomi et al. ................. 180/8.6
6,580,969 B1 * 6/2003 Ishida et al. ................ 700/245

FOREIGN PATENT DOCUMENTS

JP      2000-296484      10/2000

* cited by examiner

BIPED LOCOMOTION ROBOT

TECHNICAL FIELD

The present invention relates to a biped locomotion robot.

BACKGROUND ART

A humanoid robot, especially a biped locomotion robot, has being developed as an autonomous movement machine operable in environments where human beings have to execute difficult activities, such as care activity and in home and rescue activity in a fire scene. As shown in FIG. 1, such a robot is composed of an element system comprising a plurality of elements (head 101, body 102, and legs 103) which are under subordinative control of each other based on multiple joints, and an element relating system which relates the element system (joints 104, 105, 106, 107, 108, and 109 as 1-, 2- and 3-axis rotation systems). The whole control of the element system and the element relating system is described based on multiple variables belonging to each system and multiple parameters. However, it is difficult to separate independence and subordination between the multiple variables with high precision in the development phase. It is also difficult to describe a foot rising movement and a foot grounding movement that are associated with walking correctly.

When a theoretical walking movement and an actual walking movement do not coincide with each other, the cause of the discrepancy depends on some of the variables. Mechanical elements of the plurality of elements have physical parameters, and the rigidity and mass of each mechanical element have an important influence on the walking movement. For this reason, it is difficult to theoretically analyze whether the instability of control depends on the mass of the head or the rigidity of the body or leg. Additionally, it is difficult to analyze the discrepancy when each mechanical element is not manufactured according to theory.

Therefore, it is important to design a biped locomotion robot such that the changeable ranges of the parameters of all the elements are restricted in consideration of physical characteristics between the elements, for the purpose of facilitating the analysis and confirming the quality of the design. It is important to cause effective attenuation of influence between composite rotation systems. The definition of reasonable rules about the adjustment and initialization of a mechanical origin defining an initial condition of the movement is important to prove the quality of the design.

DISCLOSURE OF INVENTION

An object of the present invention is to provide a self-controlled biped locomotion robot with a small size.

Another object of the present invention is to provide a biped locomotion robot in which movement analysis is easy.

Another object of the present invention is to provide a biped locomotion robot in which the initialization of composite coordinate systems is easy.

Another object of the present invention is to provide a biped locomotion robot in which the control of the whole movement system can be realized better.

In an aspect of the present invention, a biped locomotion robot is composed of a fundamental body portion, an upper body housing rigidly coupled to the fundamental body portion, two leg portions movably coupled to the fundamental body portion, a foot portion movably coupled to each of the two leg portions, a head portion movably coupled to the upper body housing, and two arm portions movably coupled to the upper body housing. It is desirable that the fundamental body portion functions as a mechanical origin.

The biped locomotion robot may be further composed of two handle portions provided for opposing attachment sections of the fundamental body portion. Thus, the workability and custody can be improved.

Also, the center of gravity of the biped locomotion robot is desirably located between vertical planes, each of which passes corresponding ends of the attachment sections of the handle portions to the fundamental body portion, when the biped locomotion robot is in an initial state.

Also, each of the two leg portions may be composed of a first link functioning to support the fundamental body portion through a first joint portion and a second link functioning to support the first link through a second joint portion. In this case, it is preferable that a horizontal rotation axis of the first joint portion and a horizontal rotation axis of the second joint portion are located between the vertical planes, each of which passes through corresponding ends of the attachment sections of the two handle portions to the fundamental body portion, when the biped locomotion robot is in the initial state. Moreover, each of the foot portions may support a corresponding one of the second links through a third joint portion. It is preferable that a horizontal rotation axis of the third joint portion is located between vertical planes, each of which passes through the corresponding ends of the attachment sections of the two handle portions to the fundamental body portion, when the biped locomotion robot is in the initial state.

Also, when each of the two leg portions is composed of a first link provided to support the fundamental body portion through a first joint portion, and a second link provided to support the first link through a second joint portion, it is preferable that the rigidity of the first link is lower than that of the fundamental body portion, and the rigidity of the second link is lower than that of the first link. It is preferable that the first joint portion has a vertical rotation axis.

Also, it is desirable that the first joint portion has a vertical rotation axis.

Also, it is desirable that the upper body housing is coupled to the fundamental body portion to provide a gap region between the upper body housing and the fundamental body portion, and an energy source is arranged in the gap region.

Also, the biped locomotion robot may further include a control unit provided for a back of the upper body housing.

Also, in another aspect of the present invention, a biped locomotion robot is composed of a fundamental body portion, two first links to support the fundamental body portion through a first joint portion, and a second link to support a corresponding one of the first links through a second joint portion. The rigidity of the first link is lower than that of the fundamental body portion and the rigidity of the second link is lower than that of the first link. Also, the biped locomotion robot is further composed of a foot portion to support a corresponding one of the second links through a third joint portion. Mechanical stress transferred instantaneously through a double pendulum system (3, 4, 7, 8) between the fundamental body portion and the foot portion is relaxed or damped on the grounding of the foot portion. Thus, the control of mechanical origin for a control system of the fundamental body portion becomes easy. As a result, it becomes easy to position the second link. Moreover, the positioning of the foot portion attached to the second link with the minimum rigidity becomes easy.

In another aspect of the present invention, the biped locomotion robot is composed of a fundamental body portion in which a mechanical origin is set, a first link to support the fundamental body portion through a first joint portion, a second link to support the first link through a second joint portion, and a third link to support the second link through a third joint portion. The fundamental body portion has handle portions, and the handle portions are coupled to the fundamental body portion at two positions. It is desirable that the center of gravity (G) of the robot is located between two vertical planes passing through the two positions in the initialization of the whole posture with respect to the mechanical origin. As a result, the rotation moment when the whole of robot is carried is small, so that the stability of the robot is high and the carrying of the robot is easy. In case of the initialization, it is desirable that the rotation axis of the first joint portion, the rotation axis of the second joint portion, and the rotation axis of the third joint portion are located between the two vertical planes. Especially, the two positions corresponding to the two vertical planes are determined as two separate positions in a front direction in case of the initialization. It is desirable that the handle portions form a reference plane to the mechanical origin in case of the initialization, and the grounding surface of the foot portion can be adjusted based on the reference surface of the handle portion. Especially, by adjusting the foot portions such that the reference surface of the handle portions is parallel to the grounding surfaces of the foot portions, the adjustment of the foot portions to the origin point becomes easy. The handle portions may be outside an exterior body such as a body section cover and may be exposed. Thus, the regular initialization work becomes easy.

In another aspect of the present invention, the biped locomotion robot is composed of a fundamental body portion, an upper body housing supported by the fundamental body portion, first links to respectively support the fundamental body portion through first joint portions, second links to respectively support the first links through second joint portions, foot portions to respectively support the second links through third joint portions, and an upper portion supported by the upper body housing through a fourth joint portion. The upper body housing is attached to the fundamental body portion with a high rigidity, and arm portions and a head portion are supported by the upper body housing through joint portions. In this way, the rigidity of the support structure to support the head portion and the arm portions can be maintained high. The upper body housing is supported by the fundamental body portion through side plate sections to form a gap region, and an energy source (cell battery and so on) is arranged in the gap region. Thus, the use efficiency of the space is high.

Many various holes and an attachment structure are provided for the fundamental body portion for attachment of the upper portion and the lower portion. Therefore, the fundamental body portion is formed of thick light alloy as a whole. A proper reinforcement structure may be used for the fundamental body portion.

BEST MODE FOR CARRYING OUT THE INVENTION

Hereinafter, a biped locomotion robot of the present invention will be described in detail with reference to the attached drawings.

Figure 1:
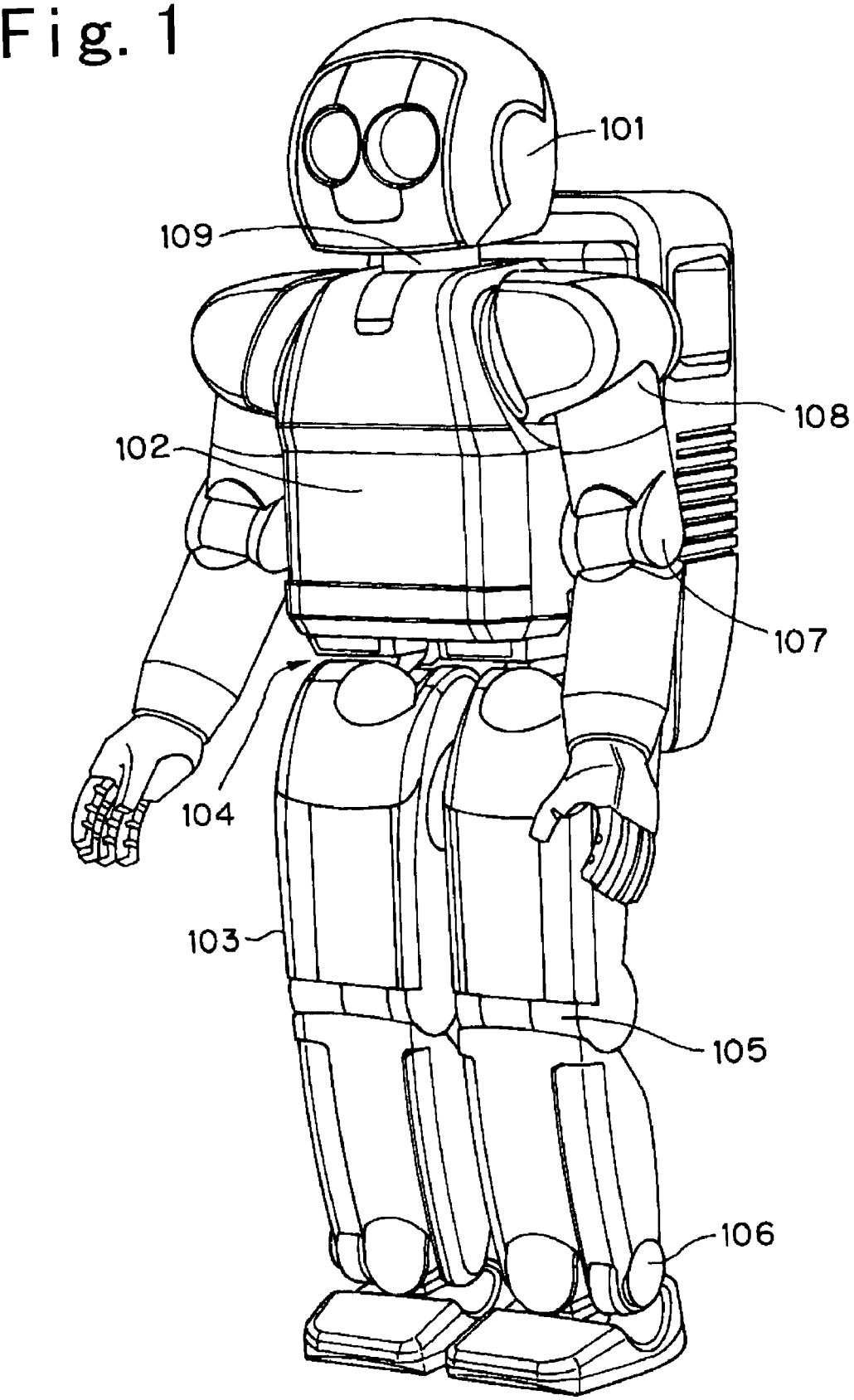
FIG. 1 is a perspective view showing a conventional biped locomotion robot.
Figure 2:
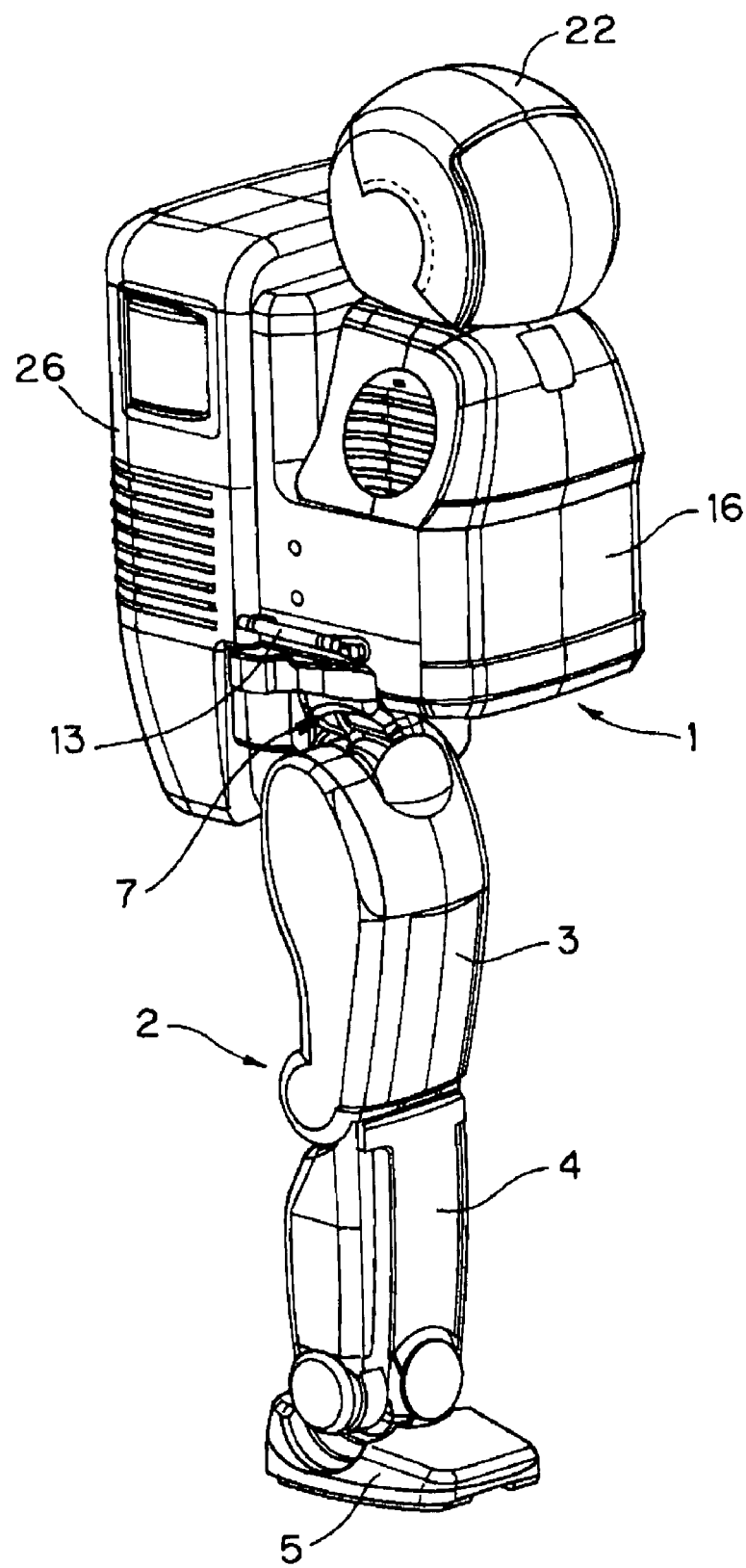
FIG. 2 is a perspective view showing a portion of a biped locomotion robot according to an embodiment of the present invention.

FIG. 2 is a perspective view of the biped locomotion robot according to an embodiment of the present invention. Referring to FIG. 2, the biped locomotion robot of the present invention is composed of a fundamental body portion 6, and a body section 1 and two leg portions 2 with respect to the fundamental body portion 6. A control unit 26 is provided on the rear side of the body section 1. In FIG. 2, only one leg portion is shown.

Figure 3:
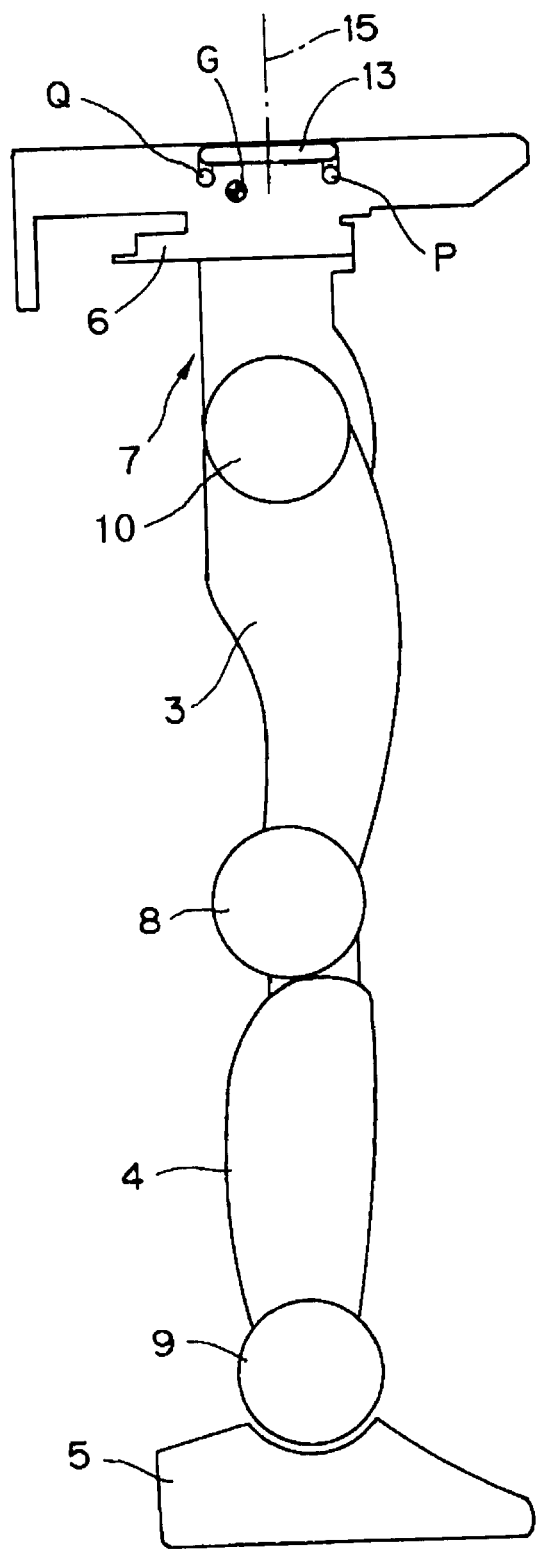
FIG. 3 is a side view geometrically showing a leg portion of the robot shown in FIG. 2.

Referring to FIG. 3, the fundamental body portion 6 is a highly rigid body. The fundamental body portion 6 is supported by 2-axis rotatably by each of the leg portions 2. Each leg portion 2 is supported by 2-axis rotatably by a foot portion 5. Also, the fundamental body portion 6 is provided with two side plate sections 12 (not shown in FIG. 3) for a gap to stand up in both side ends of the fundamental body portion 6, as shown in FIG. 4.

Each leg portion 2 has a first leg portion 3 or first link 3 and a second leg portion 4 or second link 4. The first leg portion 3 or first link 3 is coupled to the fundamental body portion 6 through a 2-axis rotatable first joint portion 7. The second leg portion 4 or second link 4 is coupled to the first leg portion 3 through a 1-axis rotatable second joint portion 8. The foot portion 5 is coupled to the second leg portion 4 through a 2-axis rotatable third joint portion 9. The foot portion 5 partially has a flat foot back surface contacting a flat floor or flat ground. It should be noted that in this example, the leg portion 2 and the foot portion 5 are coupled 2-axis rotatably. However, the leg portion 2 and the foot portion 5 may be coupled 1-axis rotatably.

In this way, the second leg portion 4 is supported by the foot portion 5 through the third joint portion 9, and the first leg portion 3 is supported by the second leg portion 4 through the second joint portion 8. Moreover, the fundamental body portion 6 is supported by the first leg portions 3 through the first joint portions 7.

Figure 4:
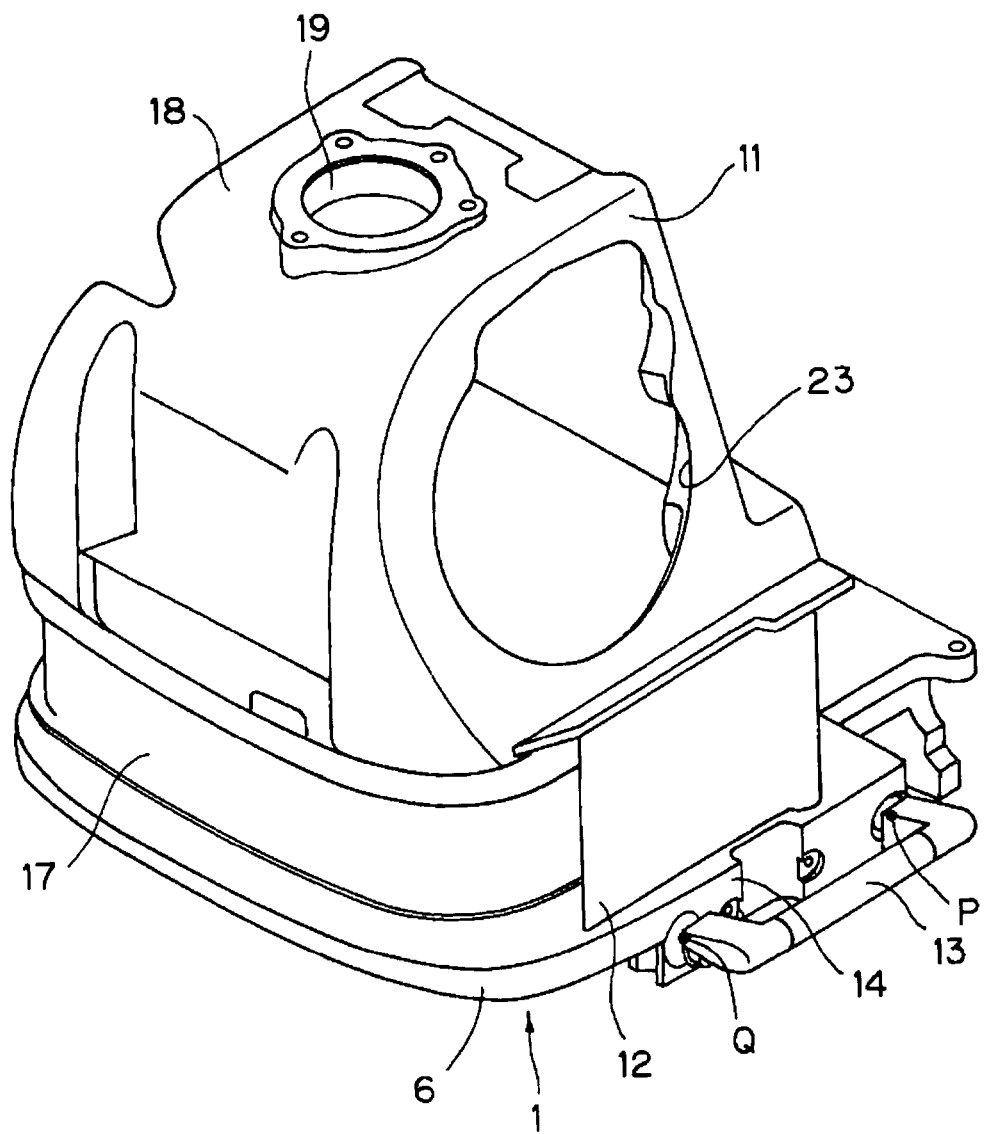
FIG. 4 is a perspective view showing an upper body housing.

As shown in FIG. 4, the body section 1 has an upper body housing 11. The upper body housing 11 is formed of light alloy as a unit. The upper body housing 11 has a proper thickness and is formed to have a high rigidity. The upper body housing 11 is rigidly coupled to the fundamental body portion 6 with the side plate sections 12 for the gap and is supported by the fundamental body portion 6. The upper body housing 11 is separated from an upper portion of the fundamental body portion 6 in an upper vertical direction by the side plate sections 12. A battery cell case 17 is detachably provided in the gap region formed between the upper portion of the fundamental body portion 6 and the lower portion of the upper body housing 11.

As shown in FIG. 4, the upper body housing 11 has a head attachment hole 19 in the upper portion 18. Also, the upper body housing 11 has arm attachment holes 23 in the side portions 11.

Two handle portions 13 are provided for attachment portions corresponding to the side plate sections 12 on both sides of the fundamental body portion 6. In more detail, the two handle portions 13 are firmly attached to attachment portions 14 on the both side edges of the fundamental body portion 6 to oppose to each other. Each of the two handle portions 13 is attached to the attachment portion 14 at two positions P and Q. It is preferable that the two corresponding positions P and the two corresponding positions Q are located on a same plane. Also, it is desirable that the plane is parallel to a horizontal plane, namely, is orthogonal to a vertical axis. Especially, it is desirable that the two positions P and Q are located on a reference plane which passes a mechanical origin to be described later. As shown in FIG. 3, it is desirable that the center of gravity G of the total mass when the biped locomotion robot is complete is positioned on a vertical plane which passes a middle point of the two positions P and a middle point of the two positions Q, or in the neighborhood of the vertical plane.

Figure 5:
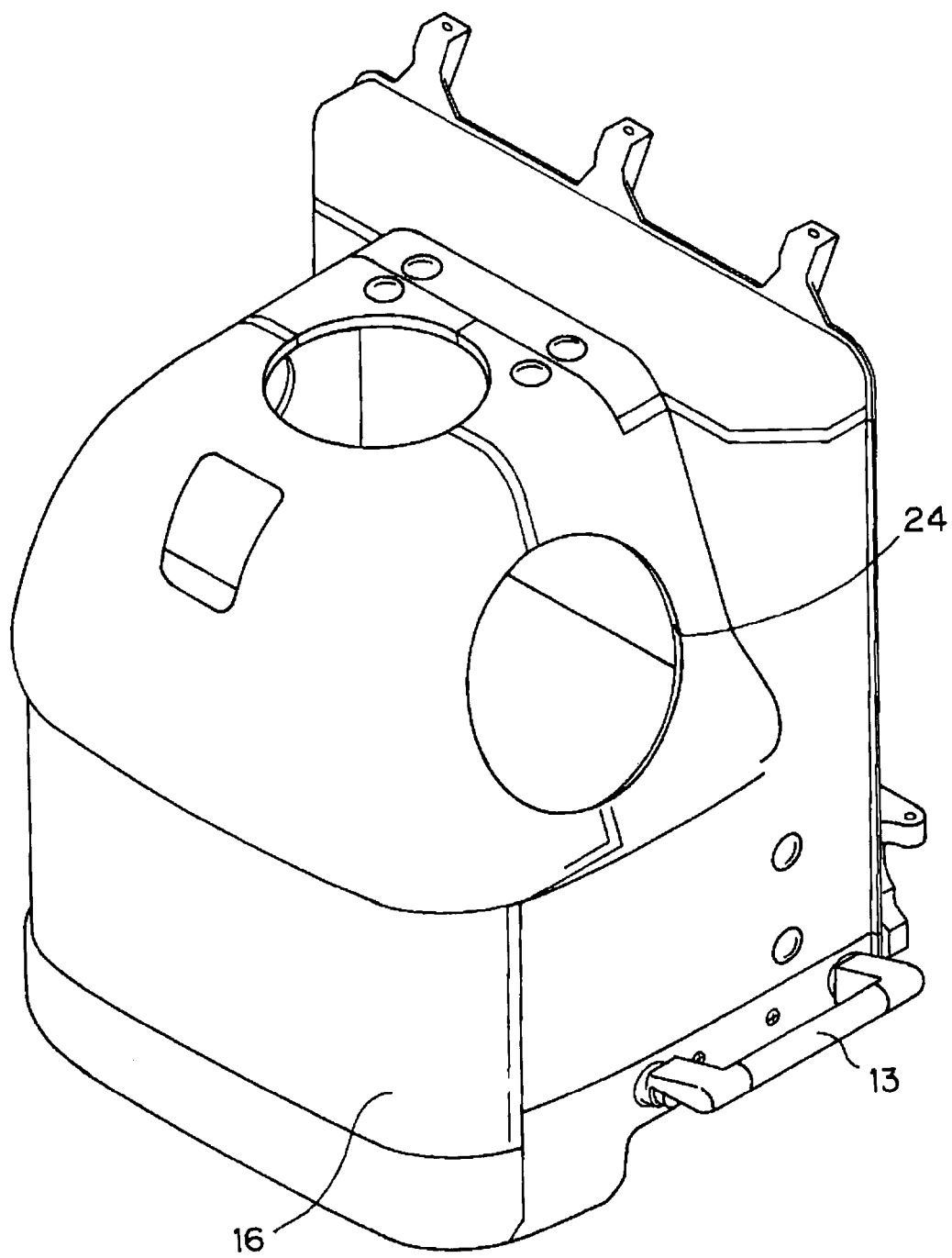
FIG. 5 is a perspective view showing an upper body housing with a cover.
Figure 6:
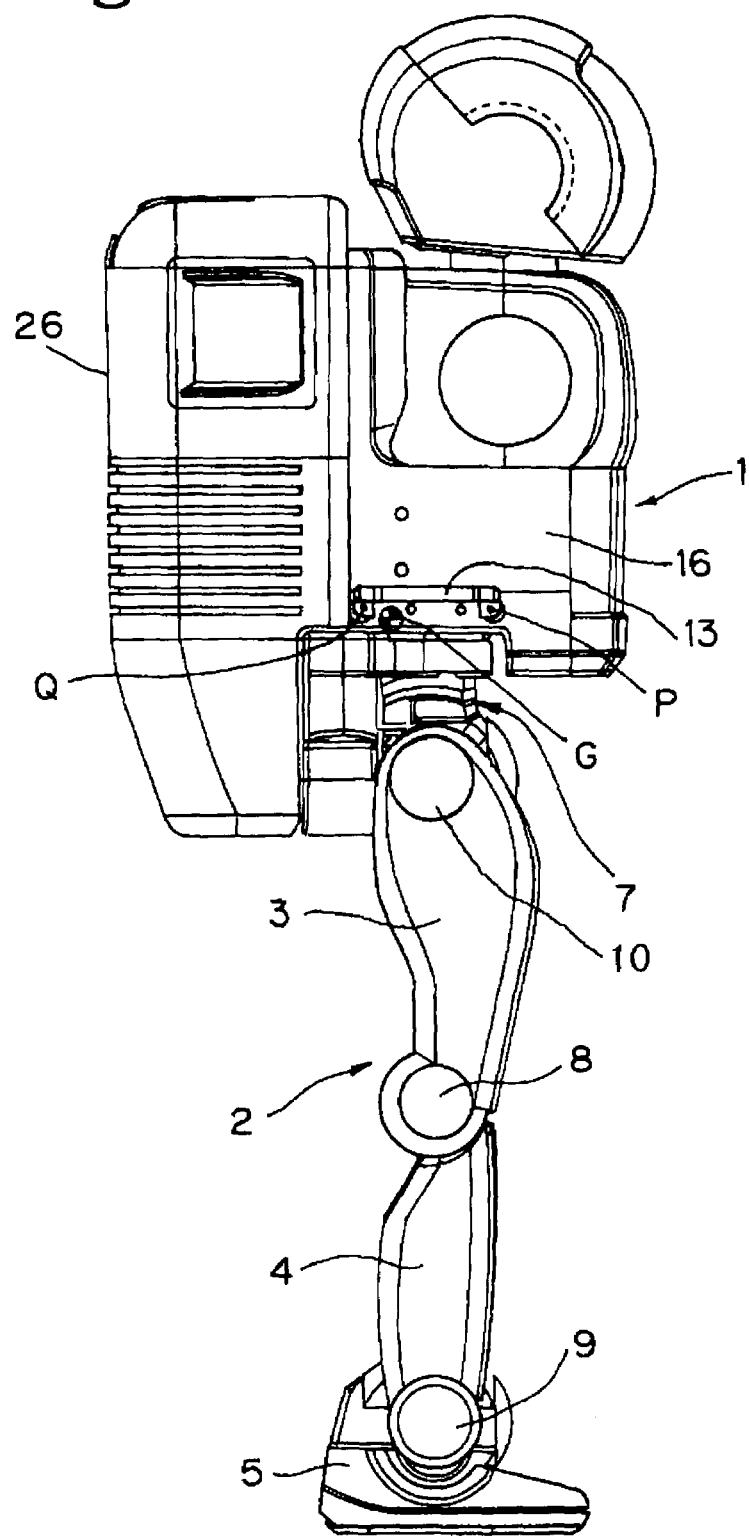
FIG. 6 is a side view of the biped locomotion robot shown in FIG. 2.
Figure 7:
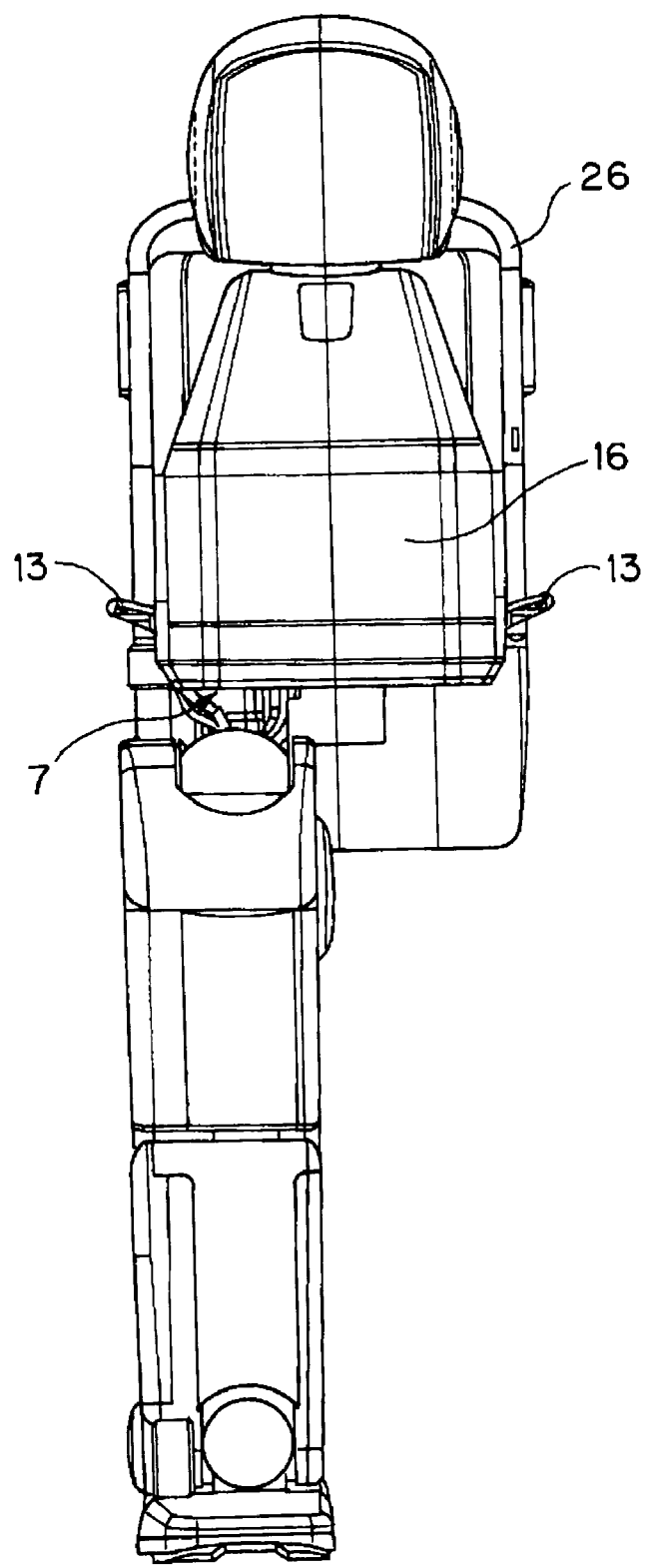
FIG. 7 is a front view showing a part of the biped locomotion robot shown in FIG. 2.

As shown in FIG. 5, the fundamental body portion 6 and the upper body housing 11 are covered by a body section cover 16. FIG. 6 and FIG. 7 show the whole biped locomotion robot when the body section cover 16 is attached to the fundamental body portion 6 in this way. In this case, only one leg portion 2 is shown in FIG. 7. The handle portion 13 is exposed outside the body section cover 16. The body section cover 16 has openings corresponding to the head attachment hole and arm attachment holes 24 in the upper body housing 11.

Figure 8:
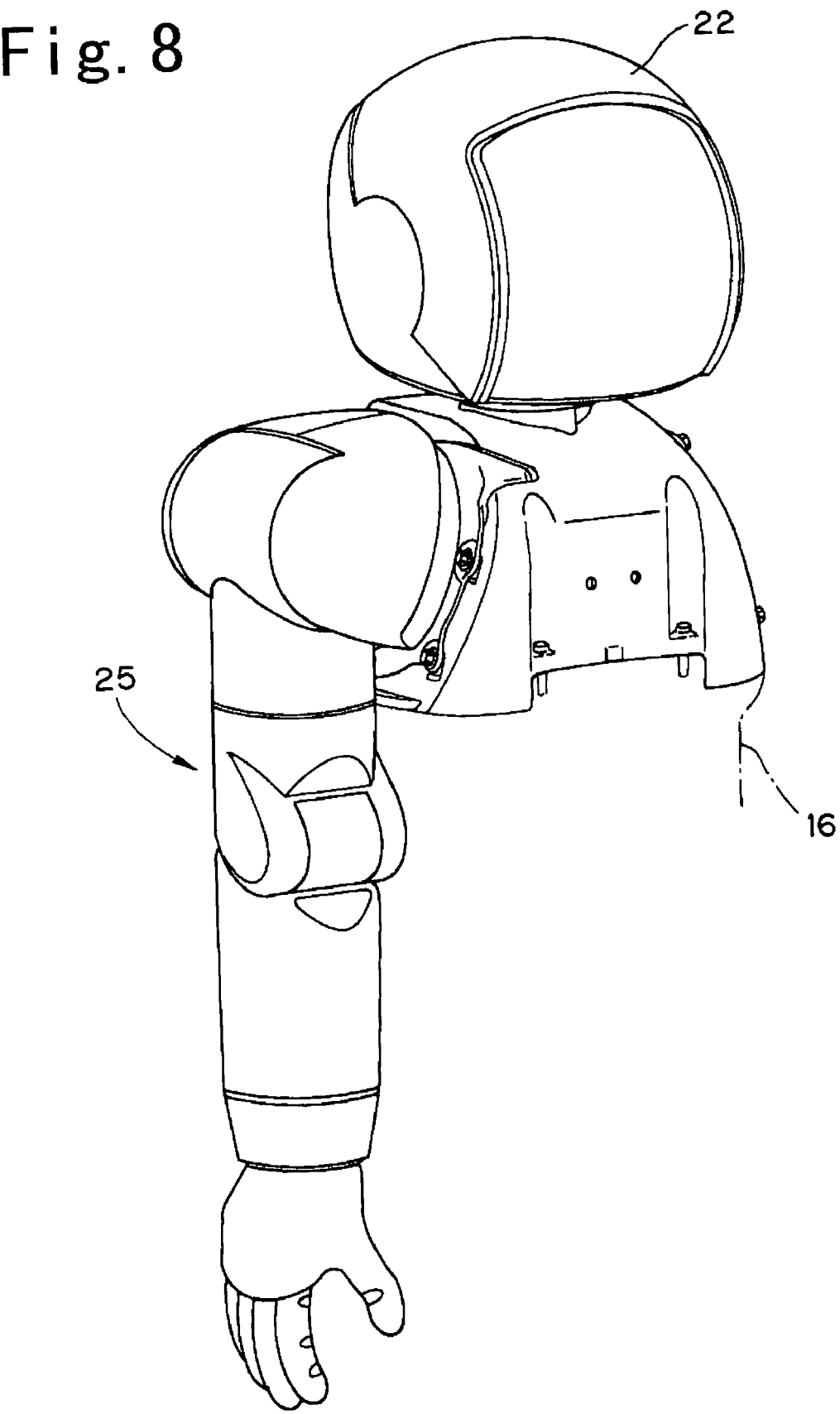
FIG. 8 is a perspective view showing an arm portion, a body section, and a head portion.

As shown in FIG. 8, the head portion 22 is attached to the upper body housing 11 such that the head portion 22 is adjusted in axis to the head attachment hole 19 of the upper body housing 11 through the body section cover 16 and is supported in the vertical direction. Like the head portion 22, the arm portions 25 are adjusted in axis to the arm attachment holes 23 and 24 of the upper body housing 11 through the body section cover 16, and is attached to the upper body housing 11 2-axis rotatably. That is, as shown in FIG. 8, the arm portion 25 has the degrees of freedom in multiple axes and is attached to the upper body housing 11 freely in swing and turning. The carrying type control unit 26 is arranged on the back side of the body section cover 16 and is attached to the fundamental body portion 6, as shown in FIG. 2.

Figure 9:
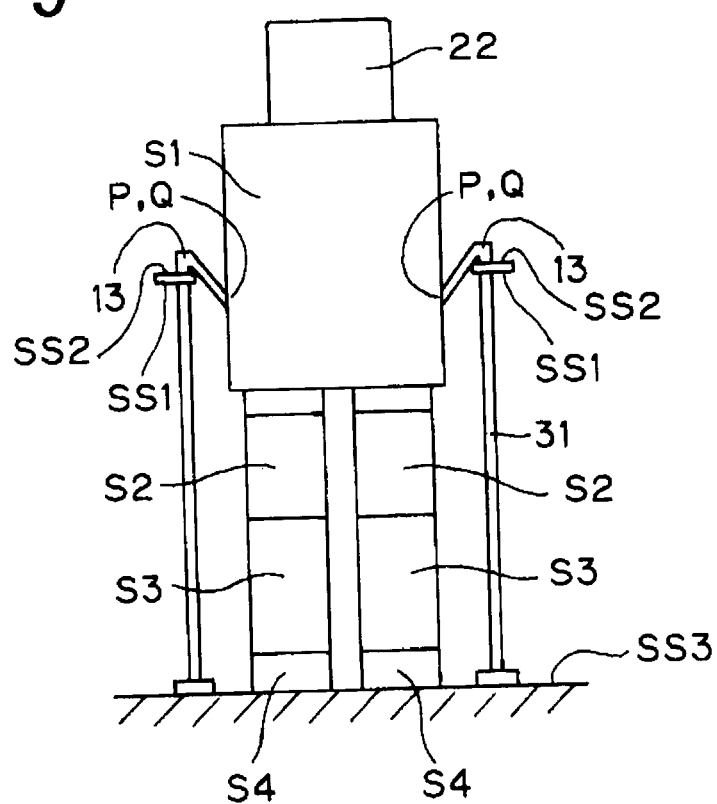
FIG. 9 is a front view showing a method of adjusting a mechanical origin in the biped locomotion robot according to the embodiment of the present invention.

FIG. 9 shows a method of adjusting a mechanical origin. An element system is composed of a fundamental body portion system S1, first link systems S2, second link systems S3 and foot systems S4. The state shown in the figure is when a walking examination is carried out with an arm system omitted. The first link system S2, the second link system S3 and the foot system S4 are provided for either side but are treated as a single system.

Figure 10:
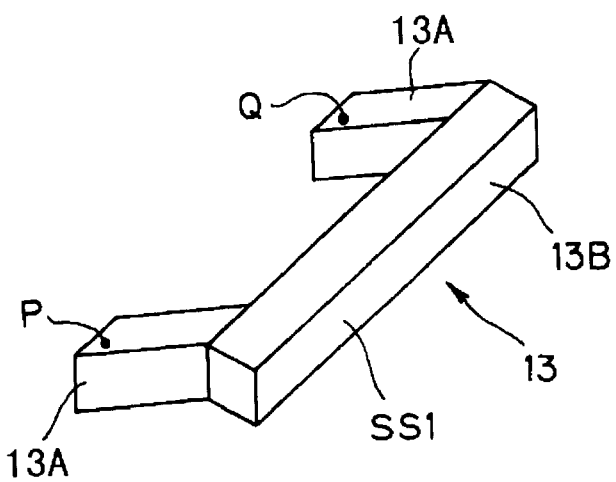
FIG. 10 is a perspective view geometrically showing a handle portion.

As shown in FIG. 10, the handle portion 13 has a unitary body of transverse bar portions 13A extending in transverse directions and a bridge portion 13B extending in a front direction. The surface of the bridge portion 13B, especially, the lower surface of the bridge portion 13B is formed as the reference surface SS1 for the mechanical origin. A reference surface SS2 corresponding to the reference surface SS1 for the mechanical origin on either side is formed as the upper surface of a rigid body pillar 31 which stands up from a reference horizontal floor surface SS3. The coincidence of the reference surface SS1 for the mechanical origin and the reference surface SS2 may be detected by a touch sensor (not shown) which detects contact of the rigid body pillar 31 and the handle portion 13.

The biped locomotion robot has a weight to the extent for a human being, and is carried by using the handle portions 13 on both sides such that the reference surface SS1 for the mechanical origin is made to coincide with the reference surface SS2 of the two rigid pillars 31. Or, the biped locomotion robot is operated by a remote radio control such that the reference surface SS1 for the mechanical origin is made to coincide with the reference surface SS2 of the two rigid pillars. After that, the three coordinate systems S2, S3, and S4 are initialized using the coordinate system S1 as reference. That is, in the initial state, the element system is reset to the origins of all the coordinate systems S1, S2, S3, S4.

Figure 11A:
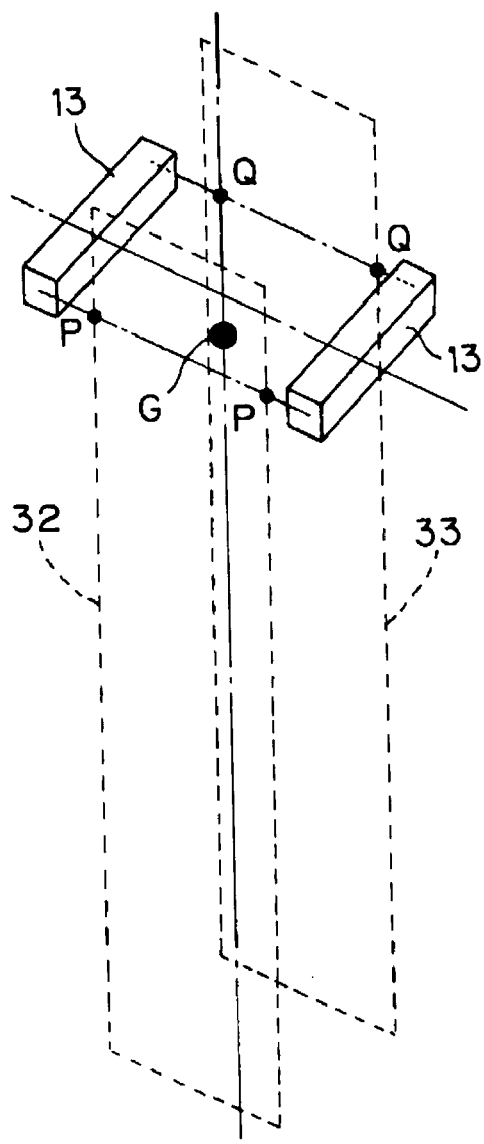
FIG. 11A is a perspective view showing the method of adjusting the mechanical origin in the biped locomotion robot according to the embodiment of the present invention.
Figure 11B:
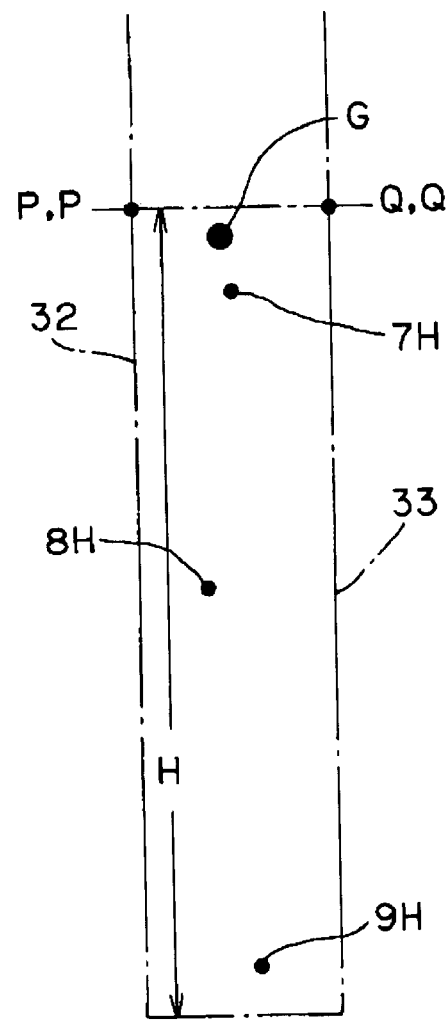
FIG. 11B is a diagram geometrically showing the method of adjusting the mechanical origin.

FIGS. 11A and 11B show an allowable range of the mechanical origin. The space formed between a vertical plane 32 containing both points P and P of the handle portions 13 on both sides and a vertical plane 33 containing both points Q and Q of the handle portions 13 on both sides is defined as the allowable range. The control target is that the horizontal rotation axis 10 extending in a horizontal direction in the first joint portion 7, the horizontal rotation axis 8H extending in a horizontal direction in the second joint portion 8, and the horizontal rotation axis 9H extending in a horizontal direction in the third joint portion are located between the two vertical planes 32 and 33. It is not necessary that the horizontal rotation axes 7H, 8H and 9H are located on a single vertical plane. Rather, it leads excellent stability that the horizontal rotation axes 7H, 8H and 9H are not located on the single vertical plane. The whole mass distribution in the robot is designed such that the center of gravity G of the whole biped locomotion robot is in the allowable range when the horizontal rotation axes 7H, 8H and 9H are in such an allowable range. The grounding surface of the foot portion 5 is contained in this allowable range. The rotation position of a servomotor or rotation drive section corresponding to each joint portion is rest and initialized when the adjustment of the center of gravity is ended.

It should be noted that in this example, the handle portions 13 are attached to the side portions 14 of the fundamental body portion 6. However, the handle portions 13 may be provided as protrusion sections (not shown). Also, it is not necessary that the handle portions 13 are on a same horizontal plane. If the position of the center of gravity is located on a slant plane passing through the handle portions 13, it is possible to stabilize the posture of the robot easily. The adjustment of the origin by the robot itself is possible by using the handle portions and the reference surface.

Various parameters are contained in the walking control. It has been proved that impact relaxation, proper rigidity and the optimization of mass of a movement body are important physical factors for the walking control. In the biped locomotion robot of the present invention, the following relations are set.

(1) The rigidity of the fundamental body portion 6 or the rigidity of the fundamental body portion 6 and the object rigidly coupled to the fundamental body portion 6>the rigidity of the first leg portion 3>the rigidity of the second leg portion 4, (2) The total mass of all the objects weighting on the fundamental body portion 6>the mass of the first leg portion 3>the mass of the second leg portion 4, and (3) The condition (1)+the condition (2)

The rigidities may be defined based on the flexural rigidity or the torsional rigidity when the both ends of each object are supported and a load or pressure is applied to a predetermined position or region. It is important that the rigidity of the object coupled to the fundamental body portion 6 and located in a further distance downwardly from the fundamental body portion 6 is lower and smaller in mass. The conditions (1), (2) and/or (3) facilitate the analysis of the variable dependence and parameter dependence in the directional control. For example, when the mass of the foot portion 5 is larger, the movement of the foot portion 5 has a large influence on the control of the whole of systems. Thus, it is difficult to determine whether the movement of the whole of systems depends on the pursuit of the servomotor or the centrifugal movement of the foot portion 5 with a large inertia (inertia mass). However, if the mass of the foot portion 5 is set small, it can be determined that the movement of the whole of systems depends on the pursuit of the servomotor largely. This depends strongly on the rigidity of each system especially. The first and second links are properly given with high rigidities and the rigidities of them are designed to be lower than the rigidity of the fundamental body portion.

When the attachment portions of the handle portion are determined for the gravity center to be located in the neighborhood of a horizontal region containing the handle portions 13, the stability is good when the whole robot is carried by using the handle portions 13. Especially, when the robot is installed on the stiff pillar by using the handle portions 13, it is easy to adjust the positions of the foot portions 5 to the handle portions 13 such that the grounding surfaces of the foot portions 5 are parallel to the reference plane of the handle portions 13.

In case that the arm portions 25 and the head portion 22 are attached freely in swinging to the fundamental body portion 6 with the highest rigidity or the upper body housing 11 having of a high rigidity and coupled to the fundamental body portion 6 in the robot, the light weight of the whole system can be realized. The cell battery is inserted between the fundamental body portion 6 and the upper body housing 11 and use efficiency of the space can be improved while keeping the rigidity.

Figure 12:
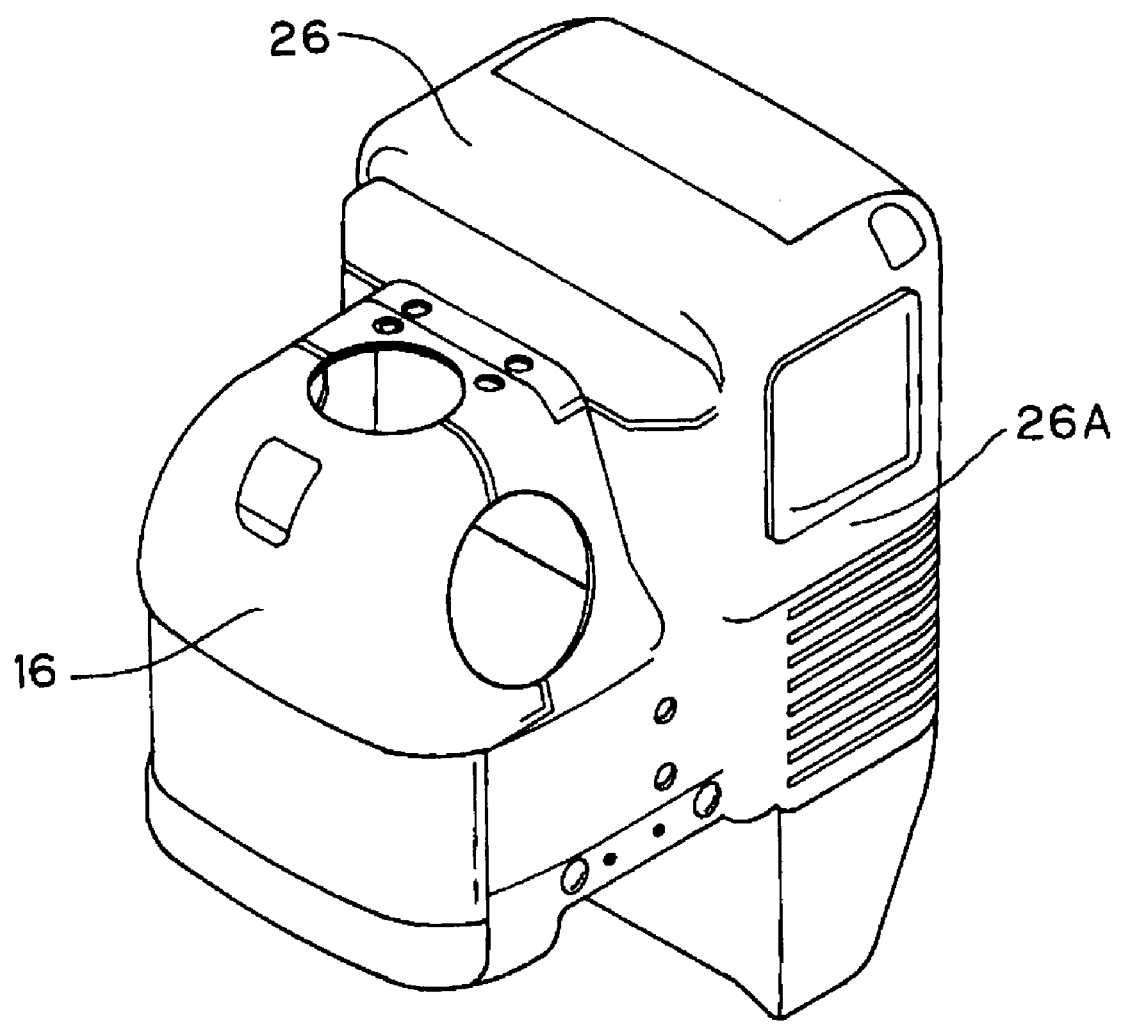
FIG. 12 is a perspective view showing a body portion with the cover, in which a power supply section is installed.
Figure 13:
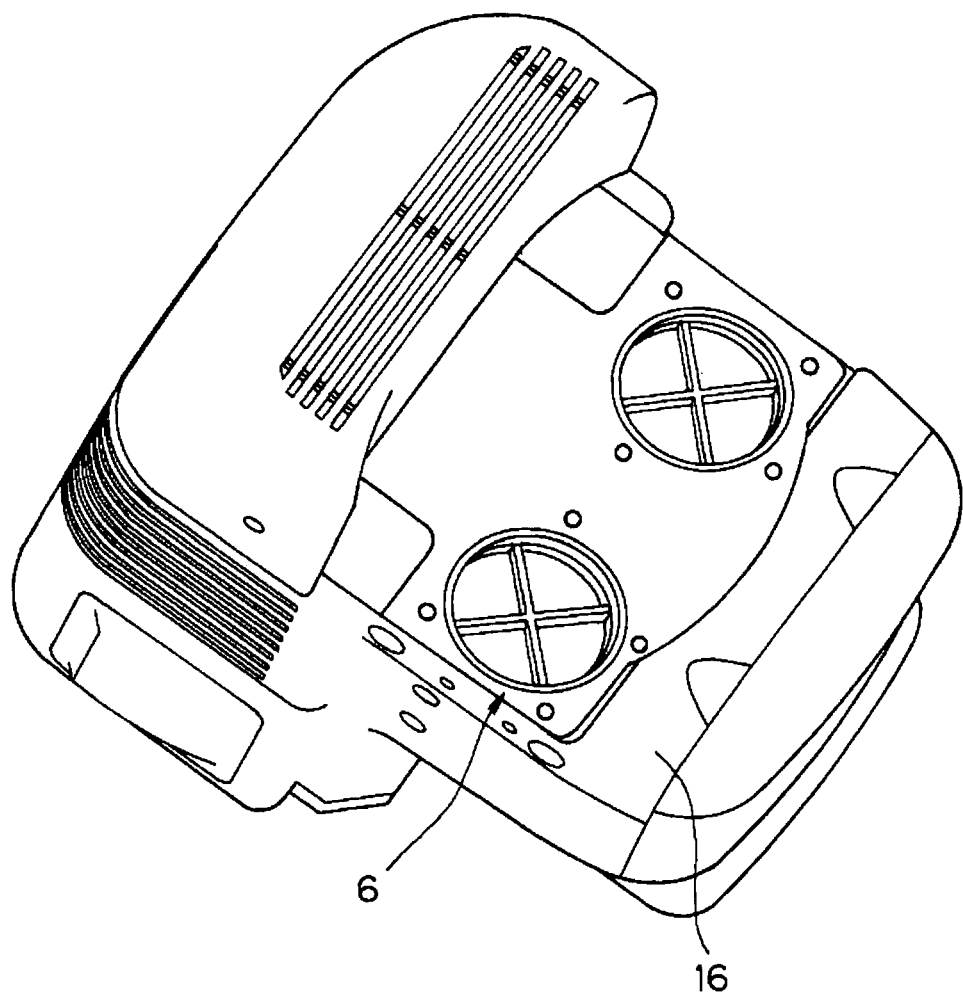
FIG. 13 is a perspective view showing the body portion of the biped locomotion robot according to the embodiment of the present invention.
Figure 14:
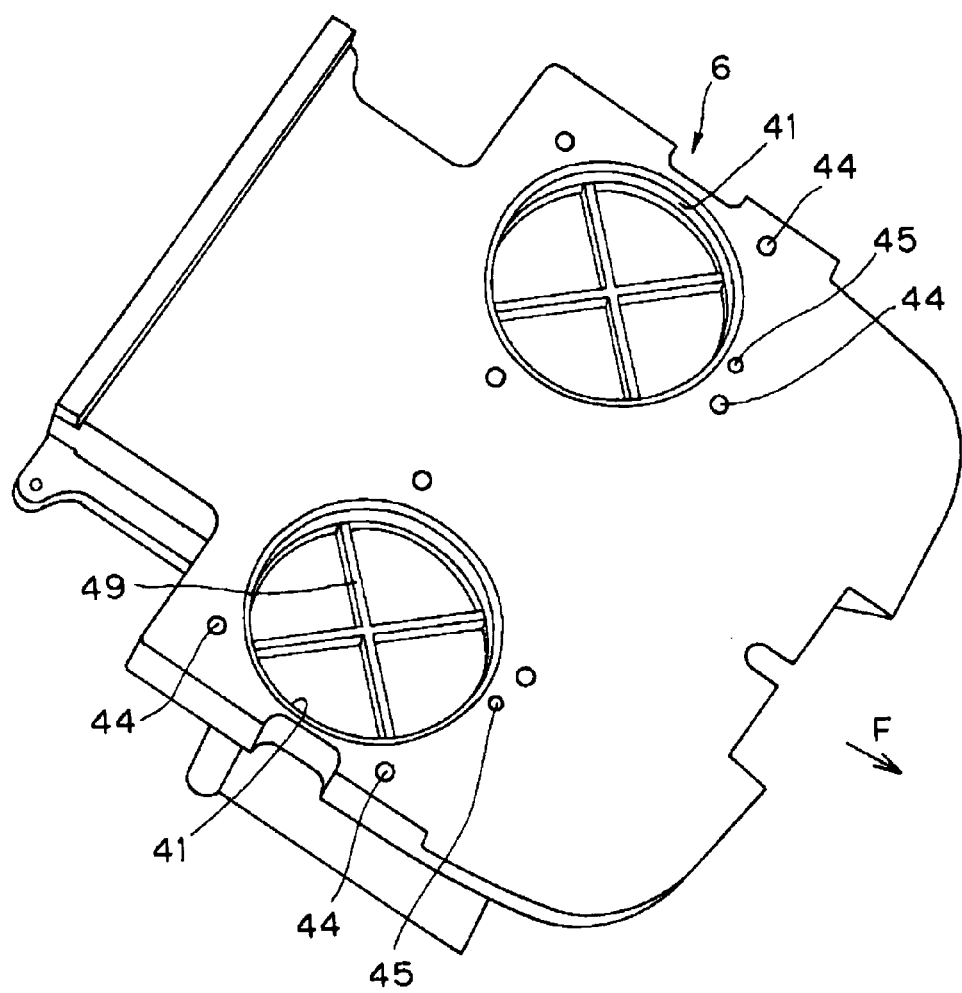
FIG. 14 is a perspective view showing the fundamental body portion.

FIG. 12 shows the body section cover 16 and the carrying type control unit 26. FIG. 13 shows a part of the fundamental body portion 6 when an upper portion 26A of the carrying type control unit 26 is removed and a part of the body section cover 16 is opened. FIG. 14 is a perspective view of the whole of fundamental body portion 6. In FIG. 14, the arrow F shows the front direction. The fundamental body portion 6 is formed of light alloy casting as a unit to have a high rigidity and a proper thickness in the vertical direction. Two positioning holes 41 corresponding to the two leg portions are formed in the fundamental body portion 6. To position each leg portion, a positioning pin hole 45 is formed. The two leg portions are firmly coupled to the fundamental body portion 6 with bolts passing through bolt holes 44 which are formed in the fundamental body portion 6. A reinforcement rib 49 is formed in a cross in each of the two positioning holes 41.

Figure 15:
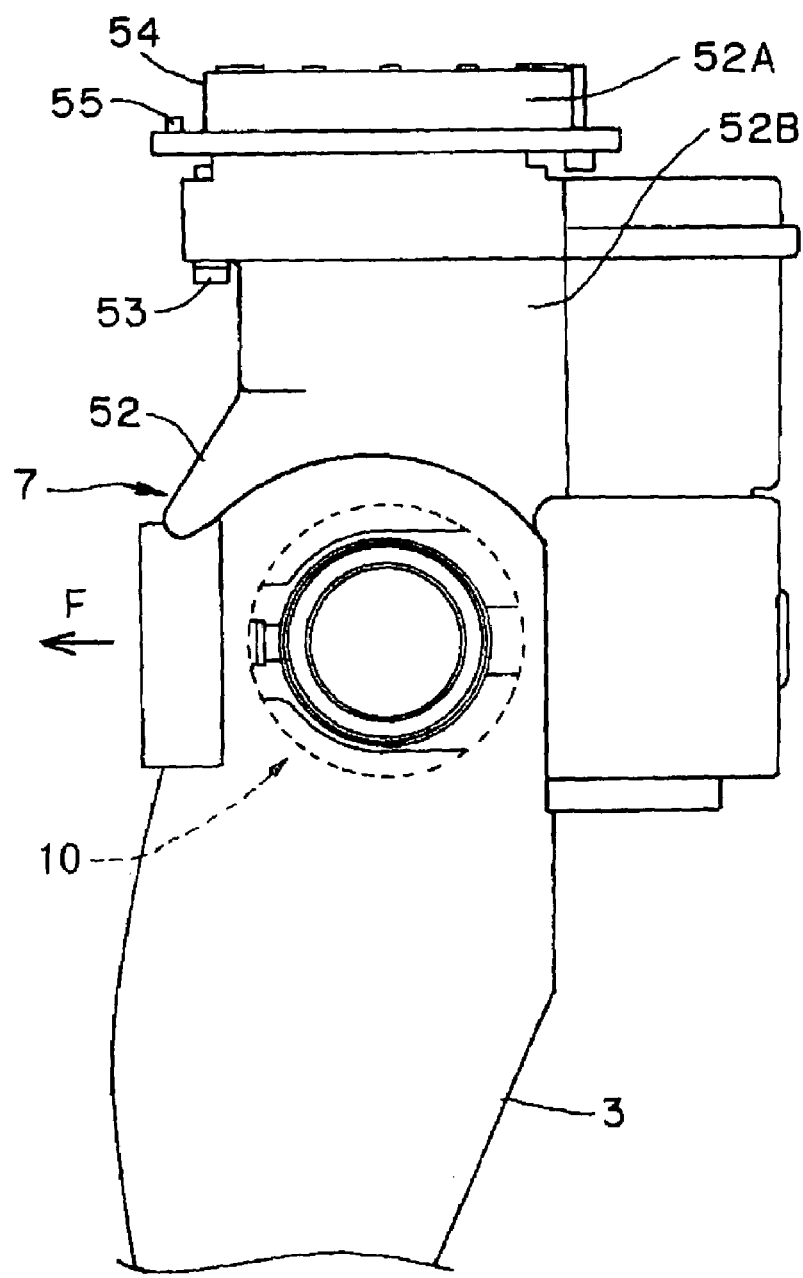
FIG. 15 is a side expanded view showing the leg portion.
Figure 16:
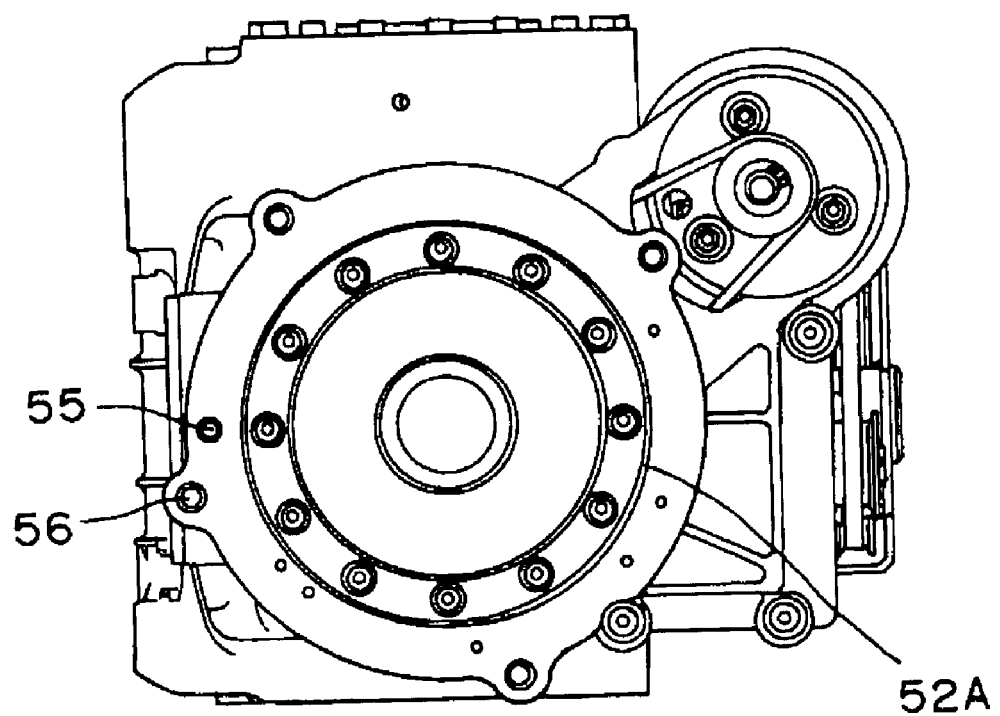
FIG. 16 is a plan view of the fundamental body portion shown in FIG. 14.

FIGS. 15 and 16 show a structural section 52 of the first joint portion 7. The structural section 52 of the first joint portion 7 has a fixation section 52A and a rotation section 52B. The top section of the fixation section 52a of the structural section 52 is formed to have an outer circular cylinder surface 54. The circular cylinder surface 54 is fit to the positioning hole 41 shown in FIG. 14 coaxially. In case of the attachment of the first joint portion 7, the positioning pin 55 which stands upwardly from a surface of the fixation section 52a is inserted in the positioning pin hole 45 of FIG. 14 to determine the position relation of the structural section 52 and the fundamental body portion 6. The structural section 52 and the fundamental body portion 6 is coupled firmly in a high rigidity with bolts (not shown) passing through bolt hole 56 on the side of the structural section 52 and the bolt holes 44 on the side of the fundamental body portion 6.

The foot portion 5 is provided apart from the center of gravity G and is controlled to have the degrees of freedom of multiple axes through the first leg portion 3 and the second leg portion 4. Therefore, the movement control of the foot portion 5 in case of the foot rising movement and the foot grounding movement is more faithfully carried out with respect to the reference coordinate system which is fixed on the fundamental body portion 6, comparing a case that the first leg portion 3 and the second leg portion 4 have higher rigidities than the fundamental body portion 6. Thus, the first joint portion 7 is rotatable with respect to the fundamental body portion 6 in one axis or two axes.

In the biped locomotion robot of the present invention, the origin adjustment can be carried out easily in a high precision. Especially, the rigidity is lower in a portion further distant from the mechanical origin. Therefore, the grounding impact can be attenuated easily at the portion further distant from the mechanical origin. The control of the rotation moment in the floating state of the foot portion becomes easy because of the lower rigidity and the fact that the portion further distant from the mechanical origin has a smaller mass. As a result, the initialization of the control on the grounding of the foot portion becomes easy. The handle portions are provided on positions near the center of gravity so that the stability is good. When the biped locomotion robot is in the stationary condition by fixing the mechanical origin using the handle portions, the initialization of the system of the robot is carried out. Therefore, the initialization work is simple.

What is claimed is:

1. A biped locomotion robot comprising:
   a fundamental body portion;
   two leg portions, each of which comprises:
   a first link provided to support said fundamental body portion through a first joint portion, and
   a second link provided to support said first link through a second joint portion; and
   a foot portion movably coupled to each of said two leg portions through a third joint portion,
   wherein a rigidity of said first link is lower than that of said fundamental body portion, and a rigidity of said second link is lower than that of said first link, wherein a rigidity, of said first link is lower than that of said fundamental body portion, and a rigidity of said second link is lower than that of said first link, wherein the rigidity of said first link is determined between a top end and a bottom end of the first link, and the rigidity of said second link is determined between a top end and a bottom end of the second link and the rigidity of the fundamental body portion is determined between a top end and a bottom end of the fundamental body portion.

2. The biped locomotion robot according to claim 1, wherein said fundamental body portion further comprises two handle portions provided in portions of said fundamental body portion which oppose each other.

3. The biped locomotion robot according to claim 2, wherein said two handle portions are provided in an initial state such that a gravity of said biped locomotion robot is located in a region defined by vertical lines passing through ends of an attachment portion of each of said two handle portions.

4. The biped locomotion robot according to claim 2, wherein said two handle portions are provided in an initial state such that a horizontal rotation axis of each of said first to third joint portions is located in a region defined by vertical lines passing through ends of an attachment portion of each of said two handle portions.

* * * * *